(12) United States Patent
Akiyama

(10) Patent No.: US 7,785,752 B2
(45) Date of Patent: Aug. 31, 2010

(54) FUEL CELL ELECTRODE AND METHOD FOR PRODUCING THE SAME

(75) Inventor: Takashi Akiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 203 days.

(21) Appl. No.: 11/714,917

(22) Filed: Mar. 7, 2007

(65) Prior Publication Data

US 2008/0220306 A1    Sep. 11, 2008

(51) Int. Cl.
*H01M 4/86* (2006.01)
*H01M 8/02* (2006.01)

(52) U.S. Cl. ....................... 429/534; 523/530

(58) Field of Classification Search ............. 429/30, 429/34, 38, 40, 42, 44
See application file for complete search history.

(56) References Cited

U.S. PATENT DOCUMENTS

2003/0022057 A1* 1/2003 Iwasaki et al. ............... 429/46

2004/0121122 A1* 6/2004 Reynolds et al. ............ 428/137
2004/0209136 A1* 10/2004 Ren et al. ..................... 429/30

FOREIGN PATENT DOCUMENTS

JP        2004-71508        3/2004

* cited by examiner

*Primary Examiner*—Patrick Ryan
*Assistant Examiner*—Muhammad Siddiquee
(74) *Attorney, Agent, or Firm*—McDermott Will & Emery LLP

(57) ABSTRACT

A fuel cell electrode having excellent power generation capability which includes a catalyst layer, a gas diffusion layer and a water-repellent layer interposed therebetween. The water-repellent layer has a uniform thickness. One surface of the water-repellent layer is bonded to the catalyst layer. The other surface of the water-repellent layer faces the gas diffusion layer. The catalyst layer and the water-repellent layer are in intimate contact with each other and have substantially no interstice therebetween.

7 Claims, 2 Drawing Sheets

FUEL CELL ELECTRODE AND METHOD FOR PRODUCING THE SAME

FIELD OF THE INVENTION

The present invention relates to a fuel cell, and more particularly to a direct oxidation type fuel cell that directly utilizes an organic fuel and to an electrode for the fuel cell.

BACKGROUND OF THE INVENTION

Fuel cells can be classified into phosphoric acid fuel cell, alkaline fuel cell, molten carbonate fuel cell, solid oxide fuel cell, polymer electrolyte fuel cell, etc., according to the type of electrolyte that they use. Among them, the polymer electrolyte fuel cell (PEFC), which is capable of low temperature operation and has high output density, has been commercialized as a power source for automobiles and for home cogeneration systems.

Fuel cells are considered as a promising future power source for portable devices such as notebook computers, cell phones and personal digital assistants (PDAs). Because fuel cells do not require charging as secondary batteries do and they can generate electricity by simply feeding a fuel, the inclusion thereof makes portable devices convenient to use.

The PEFC, in particular, is attracting a lot of attention as a promising power source for portable devices because they have a low operating temperature. Among the PEFCs, direct oxidation type fuel cells are considered as the most promising because they can offer an electric energy by directly oxidizing a liquid fuel at room temperature without reforming the liquid fuel into hydrogen. In addition, because direct oxidation type fuel cells do not require a reformer for reforming a fuel into hydrogen, smaller power sources can be readily achieved.

As a fuel for direct oxidation type fuel cells, low molecular weight alcohols or ethers are investigated. Among them, methanol is considered as the most promising because methanol can offer high energy efficiency and a high power output. The fuel cell utilizing methanol as a fuel is called "direct methanol fuel cell" (hereinafter simply referred to as "DMFC").

The reactions on the anode and the cathode of the DMFC can be expressed by the following reaction formulas (1) and (2). Oxygen serving as an oxidant supplied to the cathode is usually obtained from the air.

$$CH_3OH+H_2O \rightarrow CO_2+6H^++6e^- \quad (1)$$

$$3/2O_2+6H^++6e^- \rightarrow 3H_2O \quad (2)$$

A typical structure of DMFC will be described with reference to FIG. 1.

FIG. 1 is a schematic diagram of an example of a polymer electrolyte fuel cell. Direct methanol fuel cells also have a similar structure. An electrolyte membrane 1 is proton conductive. The electrolyte membrane 1 having an anode catalyst layer 2 on one surface thereof and a cathode catalyst layer 3 on the other surface is called a "catalyst coated membrane" (hereinafter simply referred to as "CCM"). A combination of the CCM, an anode water-repellent layer 4, a cathode water-repellent layer 5, an anode gas diffusion layer 6 and a cathode gas diffusion layer 7 is called a "membrane electrode assembly" (hereinafter simply referred to as "MEA").

In the polymer electrolyte fuel cell, the MEA is sandwiched by an anode-side separator 8a and a cathode-side separator 8b. The anode-side separator 8a has a fuel flow channel 9a for supplying a fuel to the anode. The cathode-side separator 8b has an air flow channel 9b for supplying air to the cathode. These separators and the MEA together form a unit cell for a fuel cell.

A single unit cell generates a voltage of only 1 V or less, and thus it is difficult to drive a device only with the voltage offered by a single unit cell. Accordingly, a plurality of unit cells are usually arranged in series to provide a high voltage. This is called a stack.

The layers included in each MEA are bonded by hot-pressing. However, the interfaces between the MEA and the separators are not bonded. Accordingly, the stack is clamped by applying a pressure in a stacking direction of the MEAs and the separators so as to reduce the contact resistance of the interfaces between the MEA and the separators.

The power generation reaction of fuel cell occurs inside the CCM. In a fuel cell, gas diffusion layers and water-repellent layers are indispensable. Because a fuel cell has gas diffusion layers and water-repellent layers, supplied fuel and supplied air can be diffused evenly into catalyst layers, and products such as water and carbon dioxide can be smoothly transferred to the outside.

The gas diffusion layers are usually formed of a porous material such as carbon paper or carbon cloth. The water-repellent layers comprise, for example, a conductive material such as carbon powders and a water-repellent material such as a fluorocarbon resin. The fluorocarbon resin can be, for example, polytetrafluoroethylene (PTFE).

The water-repellent layers have the following three functions in a fuel cell. One is to allow easy bonding between a gas diffusion layer and a catalyst layer. Secondly, because the water-repellent layers have water repellency, water produced at the cathode can be efficiently transferred to the outside. Thirdly, the projected fibers of carbon paper or carbon cloth serving as a gas diffusion layer can be prevented from penetrating a catalyst layer and an electrolyte membrane. Therefore, an internal short-circuit resulting from the above problems can be prevented.

The water-repellent layers are usually produced in the following procedure. First, a water-repellent paste including carbon black, PTFE, a dispersing medium, a surfactant, etc. is prepared. The water-repellent paste is applied onto a gas diffusion layer using a coating apparatus such as a doctor blade, which is then dried and baked to remove the dispersion medium, the surfactant, etc. Thereby, a water-repellent layer is obtained.

Japanese Laid-Open Patent Publication No. 2004-71508 proposes a coating apparatus having an improved structure for forming a uniformly thin water repellent layer on a gas diffusion layer without-creating cracks.

However, when the interface between the catalyst layer and the water-repellent layer is observed by a scanning electron microscope (SEM), interstices can be found in some parts of the interface. The presence of such interstices can decrease the electron conductivity of the interface between the catalyst layer and the water-repellent layer and increases an ohmic resistance, which may degrade the power generation capability of the fuel cell. Also, water produced by the power generation reaction may accumulate in the interstices of the interface at the cathode. The accumulated water inhibits air to diffuse into the catalyst layer, which degrades the power generation capability of the fuel cell.

The reason why such interstices are created will be described with reference to FIG. 2. FIG. 2 is a schematic cross-sectional diagram of a water-repellent layer 12 produced by a conventional method. FIG. 2 shows a case where the gas diffusion layer 11 is a carbon cloth. In a conventional method, the water-repellent layer 12 is formed by applying a water-repellent paste onto the gas diffusion layer 11, followed by drying. Because the carbon cloth comprises warp and weft threads, intersections of warp and weft threads are included in the carbon cloth, in other words, protrusions and recesses are periodically present in the carbon cloth. If the gas diffusion layer 11 has asperities (i.e., protrusions and recesses) on the surface onto which the water-repellent paste is applied, the surface of water-repellent layer formed on the gas diffusion layer 11 is affected by the asperities of the gas diffusion layer 11. In other words, the surface of the water-repellent layer 12 formed thereon also have the asperities. Even in a water-repellent layer 12 produced using a coating apparatus proposed by Japanese Laid-Open Patent Publication No. 2004-71508, it appears that its surface is affected by the asperities present on the surface of the gas diffusion layer 11. Accordingly, the proposal of Japanese Laid-Open Patent Publication No. 2004-71508 fails to provide a water-repellent layer having a smooth surface. Such asperities depend on the material used for the gas diffusion layer. Although carbon paper and carbon non-woven fabric have a relatively small asperities on the surface thereof, it is still difficult to obtain a water-repellent layer having a smooth surface.

In view of this, it is an object of the present invention to provide a water-repellent layer 12 having a high bonding capability to a catalyst layer and a smooth surface without being affected by the surface condition of a gas diffusion layer 11. According to the present invention, the interstices that are created at the interface between the water-repellent layer 12 and the catalyst layer 13 can be reduced. Thereby, it is possible to reduce the contact resistance of the interface between the water-repellent layer 12 and the catalyst layer 13, to reduce the occurrence of flooding phenomenon, and consequently to provide a fuel cell electrode having an excellent power generation capability.

BRIEF SUMMARY OF THE INVENTION

The present invention provides a fuel cell electrode comprising a catalyst layer, a gas diffusion layer and a water-repellent layer interposed between the catalyst layer and the gas diffusion layer, wherein the water-repellent layer has a uniform thickness, one surface of the water-repellent layer being bonded to the catalyst layer, and the other surface of the water-repellent layer facing the gas diffusion layer, and the catalyst layer and the water-repellent layer are in intimate contact with each other and have substantially no interstice therebetween.

The water-repellent layer preferably comprises a water-repellent material and an electron conductive material.

The other surface of the water-repellent layer and the gas diffusion layer may be bonded.

The present invention further relates to a fuel cell comprising: a membrane electrode assembly comprising an anode, a cathode and an electrolyte membrane interposed between the anode and the cathode; an anode-side separator having a fuel flow channel for supplying a fuel to the anode; and a cathode-side separator having an air flow channel for supplying air to the cathode, wherein at least one selected from the anode and the cathode is the fuel cell electrode described above.

The present invention further relates to a method for producing a fuel cell electrode comprising the steps of: forming a catalyst layer on an electrolyte membrane; applying a mixture of a water-repellent material and an electron conductive material onto a substrate and drying the mixture to form a water-repellent layer having a uniform thickness; bonding the catalyst layer to one surface of the water-repellent layer formed on the substrate; and removing the substrate from the water-repellent layer and placing a gas diffusion layer on the other surface of the water-repellent layer.

The present invention still further relates to a method for producing a fuel cell electrode comprising the steps of: forming a catalyst layer on an electrolyte membrane; applying a mixture of a water-repellent material and an electron conductive material onto a substrate and drying the mixture to form a water-repellent layer having a uniform thickness; bonding a gas diffusion layer to one surface of the water-repellent layer formed on the substrate; and removing the substrate from the water-repellent layer and bonding the catalyst layer on the other surface of the water-repellent layer.

According to the present invention, regardless of the surface condition of the gas diffusion layer, a water-repellent layer having a smooth surface can be formed without creating interstices at the interface between the water-repellent layer and the catalyst layer. Therefore, a water-repellent layer having a high bonding capability to a catalyst layer can be formed. Thereby, it is possible to provide a fuel cell electrode having excellent power generation capability in which the contact resistance at the interface between the water-repellent layer and the catalyst layer as well as the occurrence of flooding phenomenon are reduced.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 3:
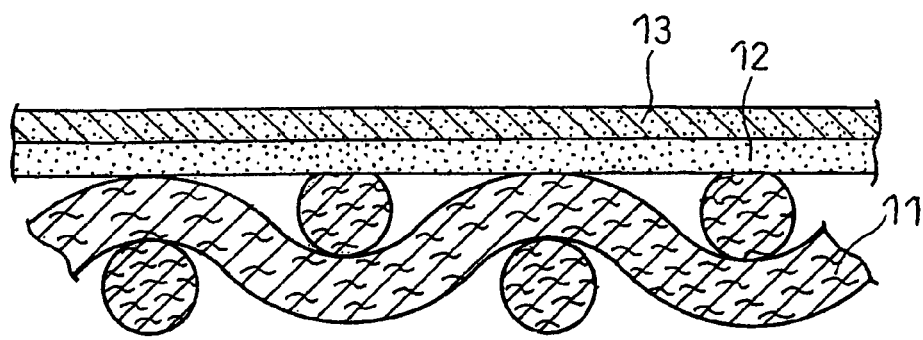
FIG. 3 is a schematic cross-sectional diagram showing the condition of a gas diffusion layer, a water-repellent layer and a catalyst layer in a fuel cell electrode according to an embodiment of the present invention.

The bonding condition between a catalyst layer and a water-repellent layer included in a fuel cell electrode of the present invention will be described with reference to FIG. 3. FIG. 3 is a schematic cross-sectional diagram showing the condition of a gas diffusion layer 11, a water-repellent layer 12 and a catalyst layer 13 according to an embodiment of the present invention. The water-repellent layer 12 is, for example, a sheet having a uniform thickness. Onto one surface of the water-repellent layer 12 is intimately bonded the catalyst layer 13. The other surface of the water-repellent layer 12 faces the gas diffusion layer 11. In other words, substantially no interstice exists at the interface between the water-repellent layer 12 and the catalyst layer 13. Even if there were any interstice, the space would be very small.

The condition in which substantially no interstice exists at the interface between the water-repellent layer 12 and the catalyst layer 13 mentioned above refers to the following condition, for example.

For example, the interface between the water-repellent layer 12 and the catalyst layer 13 is observed by an SEM. In a 1 mm long portion (linear length) of the interface, the total length L of the regions having a distance between the water-repellent layer 12 and the catalyst layer 13 of 5 μm or greater is determined. When the total length L is 0.1 mm or less, it can be deemed that substantially no interstice exists at the interface between the water-repellent layer 12 and the catalyst layer 13. If the interface has a non-facing portion where the water-repellent layer 12 and the catalyst layer 13 do not face each other, as in the case where the catalyst layer 13 has a crack, the non-facing portion is excluded in the determination of the total length L. By achieving the condition in which substantially no interstice exists at the interface between the water-repellent layer 12 and the catalyst layer 13, it is possible to suppress the reduction in electron conductivity at the interface. Moreover, because product water produced by power generation is less likely to accumulate at the interface between the water-repellent layer 12 and the catalyst layer 13, it is possible to suppress the occurrence of flooding phenomenon. Furthermore, because the water-repellent layer 12 and the catalyst layer 13 are in intimate contact, the handling of the water-repellent layer 12 which is very thin becomes easier in the production process, and the structure of the water-repellent layer 12 can be prevented from being broken.

The condition in which the water-repellent layer has a uniform thickness refers to the following condition, for example.

For example, a cross section of the water-repellent layer is observed by an SEM. The thickness of the water repellent layer is measured, for example, at six different points in a predetermined region of the water-repellent layer. From the average value of the thicknesses measured at six different points, the thickness of the water-repellent layer can be determined. When a difference between the maximum thickness and the minimum thickness is not greater than 24% of the average value, the water-repellent layer can be considered to have a uniform thickness.

As the SEM, for example, 3D Real Surface View Microscope VE-9800 manufactured by Keyence Corporation can be used.

The water-repellent layer preferably comprises a water-repellent material and an electron conductive material. The water-repellent layer preferably has a thickness (average value) of 10 to 50 μm because sufficient conductivity and sufficient water repellency can be obtained and the air diffusibility of the electrode is not inhibited. The amount of the water-repellent material is preferably 10 to 60 wt % relative to the total amount of the water-repellent material and the electron conductive material because both excellent water repellency and high electron conductivity can be achieved.

The water-repellent material can be any resin as long as it has water repellency. Specifically, any conventionally known water-repellent material can be used, such as a fluorocarbon resin. An example of the fluorocarbon resin is PTFE.

The electron conductive material can be any material as long as it has conductivity and is capable of forming a water-repellent layer having micropores. Examples of the electron conductive material include carbon black and graphite powder. It is particularly preferred to use carbon black such as furnace black or acetylene black. The mixture of the water-repellent material and the electron conductive material can be obtained by, for example, mixing with stirring the electron conductive material and the water-repellent material with a dispersing medium.

The other surface of the water-repellent layer and the gas diffusion layer can be, but not necessarily, bonded. When the other surface of the water-repellent layer and the gas diffusion layer are not bonded, they can be fixed by, for example, a pressure applied to clamp the stack of the unit cells.

Hereinafter, a method for producing a fuel cell electrode of the present invention will be described.

(i) Formation of Catalyst Layer

The production method of the present invention includes a step of forming a catalyst layer on an electrolyte membrane. The catalyst layer preferably contains a catalyst powder and a proton conductive polymer electrolyte. In this step, a catalyst paste containing a catalyst powder, a polymer electrolyte and a dispersing medium is first prepared. As the polymer electrolyte, a perfluorosulfonic acid polymer can be used. A specific example of the polymer is Nafion (trademark) manufactured by E.I. Du Pont de Nemours & Co. Inc.

The catalyst paste is applied directly onto the surface of the electrolyte membrane using, for example, a spraying device, followed by drying to obtain a CCM. The drying of the catalyst layer is preferably performed, for example, at 50 to 70° C. for 1 to 60 minutes so as to prevent the solvent from remaining in the catalyst layer. Alternatively, the catalyst paste may be applied onto a substrate made of PTFE or the like by a doctor blade or the like, followed by drying to form a catalyst layer on the substrate. In this case, two catalyst layers formed on the substrates are placed on both surfaces of the electrolyte membrane to form an anode catalyst layer and a cathode catalyst layer. The resultant is then hot-pressed to bond the catalyst layers to the electrolyte membrane. Thereby, a CCM can be obtained.

The catalyst powder may be a fine powder of a catalyst metal or a carbon powder carrying a catalyst metal. For the anode catalyst layer, it is preferred to use a catalyst metal capable of reducing catalytic activity degradation (poisoning) caused by carbon monoxide produced as an intermediate product. An example of the catalyst metal is an alloy of platinum and ruthenium. As the catalyst metal for the cathode catalyst layer, it is preferred to use platinum.

As the electrolyte membrane, a membrane comprising a proton conductive polymer electrolyte can be used. As the polymer electrolyte, a perfluorosulfonic acid polymer is preferred such as Nafion (trademark) or Flemion (trademark). There is developed an electrolyte membrane effective to reduce methanol crossover. Specifically, a composite membrane of an inorganic material and an organic material, a composite membrane comprising organic materials, and an electrolyte membrane comprising a hydrocarbon polymer containing no fluorine. The electrolyte membrane is not specifically limited. The polymer electrolytes listed above can also be used as the polymer electrolyte contained in the above catalyst layer.

(ii) Formation of Water-Repellent Layer

The production method of the present invention includes a step of forming a water-repellent layer having a uniform thickness. The water-repellent layer can be obtained by applying a mixture (water-repellent paste) of a water-repellent material and an electron conductive material onto a substrate, followed by drying. The substrate as used herein is not a gas diffusion layer. In other words, a water-repellent layer is formed on a substrate having a smooth surface instead of applying the mixture of a water-repellent material and an electron conductive material directly onto a gas diffusion layer. Thereby, it is possible to obtain a water-repellent layer having a uniform thickness and a smooth surface without being affected by the surface condition of a gas diffusion layer.

The PTFE for use as the water-repellent material is obtainable as a dispersion. In this case, the dispersion contains a surfactant for dispersing PTFE. When the water-repellent layer contains the surfactant, the water repellency of the water-repellent layer will decrease. For this reason, it is necessary to bake the water-repellent layer so as to decompose and remove the surfactant. The baking temperature is preferably 250° C. or higher (e.g., 250 to 360° C.). As such, when the substrate is made of a resin, it is preferred to use a highly heat resistant resin that does not melt or deform even at a baking temperature as stated above. Examples of the resin include PTFE and FEP (tetrafluoroethylene-hexafluoropropylene copolymer).

As the substrate, a resin film or metal film having a thickness of 0.01 to 1.0 mm can be used, for example. Considering the heat resistance as described above, a highly heat resistant resin, such as PTFE, or metal is preferred. When pressing (e.g., hot-pressing) is not performed in the subsequent step of bonding the water-repellent layer and the catalyst layer or the water-repellent layer and the gas diffusion layer, which will be described later, the substrate can be made of glass or ceramic. Alternatively, the substrate can be a metal, glass or ceramic having a thin coating of heat resistant resin coated on the surface thereof.

The substrate preferably has excellent surface smoothness. The substrate preferably has a surface roughness Rmax of 1 µm or less. If the substrate is made of a material having low surface smoothness, a water-repellent layer having a uniform thickness and a smooth surface may not be obtained. Further, when the substrate is removed from the water-repellent layer, part of the water-repellent layer may remain in the substrate.

The method for applying the mixture of a water-repellent material and an electron conductive material onto the substrate is not specifically limited as long as it can yield a water-repellent layer having a uniform thickness. For example, any conventionally know method is preferably used such as doctor blading, screen printing or spraying. After the application of water-repellent material, drying is performed to obtain a water-repellent layer.

(iii) Bonding of Catalyst Layer to Water-Repellent Layer

The production method of the present invention includes a step of bonding the catalyst layer to a surface of the water-repellent layer formed on the substrate. By bonding the catalyst layer to the water-repellent layer having a uniform thickness and a smooth surface, it is possible to intimately bond the catalyst layer and the water-repellent layer. This suppresses the reduction in electron conductivity of the interface between the catalyst layer and the water-repellent layer as well as the occurrence of flooding phenomenon.

The method for bonding the catalyst layer to the water-repellent layer is not specifically limited as long as the catalyst layer and the water-repellent layer can be bonded intimately. For example, the catalyst layer and the water-repellent layer allowed to face each other can be hot-pressed to heat-transfer the water-repellent layer to the catalyst layer. A conductive adhesive may be interposed between the catalyst layer and the water-repellent layer.

(iv) Placement of Gas Diffusion Layer

The production method of the present invention includes a step of removing the substrate from the water-repellent layer and placing a gas diffusion layer on the other surface of the water-repellent layer. Thereby, a fuel cell electrode can be obtained. The gas diffusion layer and the other surface of the water-repellent layer can be bonded. However, the gas diffusion layer and the water-repellent layer are not necessarily bonded. When the gas diffusion layer and the water-repellent layer are not bonded, they can be fixed by a pressure.

According to the production method of another embodiment of the present invention, after the step of forming a water-repellent layer on a substrate, a step of bonding a gas diffusion layer to a surface of the water-repellent layer may be performed. In this case, because the water-repellent layer is supported by the substrate during the step of bonding a gas diffusion layer to the water-repellent layer, the water-repellent layer is unlikely to be affected by the surface condition of the gas diffusion layer. By bonding the assembly comprising the water-repellent layer and the gas diffusion layer to a catalyst layer, it is possible to obtain an interface between the catalyst layer and the water-repellent layer which are in intimate contact with each other. In this case, after the water-repellent layer and the gas diffusion layer are bonded by, for example, roller-pressing, the substrate is removed from the water-repellent layer. This bonded assembly including the water-repellent layer and the gas diffusion layer is then bonded to a CCM by hot-pressing. Thereby, a fuel cell electrode in which the catalyst layer and the water-repellent layer are intimately bonded with substantially no interstice therebetween.

The gas diffusion layer is preferably made of a conductive porous material. Examples include carbon paper, carbon non-woven fabric and carbon cloth. To enhance removability of product water, the cathode gas diffusion layer is preferably immersed in a dispersion of PTFE, which is then dried and baked to impart water repellency. Water repellency may be imparted to the anode gas diffusion layer as well.

An embodiment of a fuel cell including the fuel cell electrode of the present invention will be described with reference to FIG. 1.

A fuel cell comprises an anode-side separator 8a, a cathode-side separator 8b and an MEA (membrane electrode assembly) interposed between the anode-side separator 8a and the cathode-side separator 8b. The MEA comprises an anode, a cathode and an electrolyte membrane 1 interposed between the anode and the cathode. The anode includes an anode catalyst layer 2, an anode water-repellent layer 4 and an anode gas diffusion layer 6. The cathode includes a cathode catalyst layer 3, a cathode water-repellent layer 5 and a cathode gas diffusion layer 7. The anode-side separator 8a has a fuel flow channel 9a for supplying a fuel to the anode. The cathode-side separator 8b has an air flow channel 9b for supplying air to the cathode.

In the case of a single unit cell, end plates 10 to be clamped by pressure are disposed on the outer surface of the anode-side separator 8a and the outer surface of the cathode-side separator 8b, respectively, which is then clamped by applying a pressure from both sides of the end plates 10 using bolts and nuts. The material for the end plates 10 is not specifically limited. In the case of forming a stack by stacking a plurality of unit cells, the unit cells are stacked by interposing separators, each having a fuel flow channel 9a formed on one surface thereof and an air flow channel 9b formed on the other surface, between every adjacent MEAs, for example.

The material for the separator is not specifically limited as long as it has excellent airtightness and high electron conductivity. For example, a separator comprising a carbon material such as graphite can be used. The shape of the fuel flow channel and the air flow channel formed on the separator is not specifically limited, either. The flow channels can have a serpentine shape, for example. The flow channels can be formed by cutting, or by molding such as injection molding or compression molding. When a metal plate is used as the separator, it is preferred to form a coating thereon so as to prevent corrosion.

The fuel can be, for example, methanol, methanol aqueous solution or the like. The concentration of methanol contained in the methanol aqueous solution is preferably 1 to 18 mol/L, for example.

The present invention will be described below in further detail with reference to examples. However, it should be understood that the examples given below are not intended to limit the scope of the present invention.

EXAMPLE 1

Figure 1:
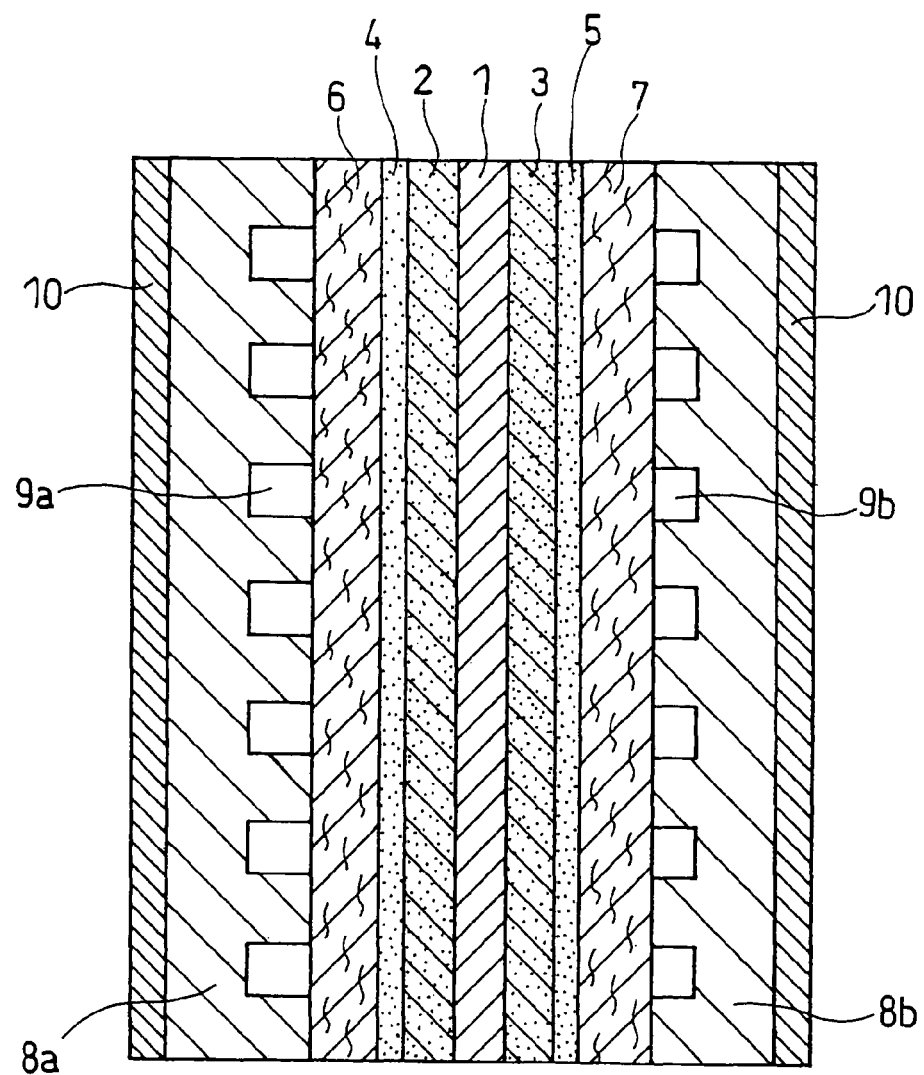
FIG. 1 is a schematic cross-sectional diagram of an example of a fuel cell.

A fuel cell as shown in FIG. 1 was produced.

(1) Catalyst Layer

As the anode catalyst powder, conductive carbon particles having an average primary particle size of 30 nm and carrying 50 wt % of a platinum-ruthenium alloy containing platinum and ruthenium at an atomic ratio of 1:1 were used. As the cathode catalyst powder, the same carbon particles as was used as the anode catalyst powder carrying 50 wt % of platinum were used.

Each catalyst powder was mixed with a dispersion of Nafion (trademark) manufactured by E.I. Du Pont de Nemours & Co. Inc, followed by deaeration. Thereby, an anode catalyst paste and a cathode catalyst paste were obtained. In each of the catalyst pastes, the amount of the polymer electrolyte was 30 wt % relative to the total amount of the catalyst powder and the polymer electrolyte. Each paste was applied onto a substrate using a bar coater, which was then allowed to stand for one day at room temperature for drying. In this manner, an anode catalyst layer 2 and a cathode catalyst layer 3 were obtained. The substrates used here were 50 μm thick polypropylene sheets.

(2) CCM

As the electrolyte membrane 1, Nafion 117 (trademark) (thickness: 178 μm) manufactured by E.I. Du Pont de Nemours & Co. Inc. was used. The electrolyte membrane 1 was sandwiched by the anode catalyst layer 2 and the cathode catalyst layer 3, after which a pressure of 10 MPa was applied thereto for 3 minutes using a hot-pressing apparatus maintained at a temperature of 125° C. for heat transferring. Thereafter, the polypropylene sheet (substrate) was removed to obtain a CCM. The catalyst layers were square with 5 cm sides.

(3) Water-Repellent Layer

An anode water-repellent layer and a cathode water-repellent layer were produced in the same manner. As the substrate, a 50 μm thick PTFE sheet obtainable from Nichias Corporation was used. This sheet had a surface roughness Rmax of not greater than 1 μm.

A water-repellent paste was prepared by mixing with stirring an acetylene black powder (average particle size: 35 nm) obtainable from Denki Kagaku Kogyo Kabushiki Kaisha and a PTFE dispersion D-1 obtainable from Daikin Industries, Ltd. The amount of PTFE was 40 wt % relative to the total amount of PTFE and acetylene black. The substrate was attached to a hot plate maintained at a temperature of 60° C. The obtained water-repellent paste was applied onto the substrate by spraying using an airbrush that utilizes compressed air to form a film. The film was dried on the hot plate while spraying. Subsequently, the formed film was further dried in a thermostatic chamber maintained at 100° C., and then baked in an electric furnace heated at 270° C. for 2 hours so as to remove the surfactant. In this manner, a water-repellent layer was obtained.

Using a scanning electron microscope (SEM) (namely, 3D Real Surface View Microscope VE-9800 manufactured by Keyence Corporation), the water repellent layer was subjected to six-point measurement in which the thickness of the water repellent layer was measured at six different points in a predetermined region of the water-repellent layer. The anode water-repellent layer and the cathode water-repellent layer both had an average thickness of 30 μm. No crack was observed in both water-repellent layers.

The thickness of the water-repellent layer before and after the step of bonding the catalyst layer or gas diffusion layer to the water repellent layer does not vary substantially. For this reason, the thickness of the water-repellent layer may be measured before the bonding step or after the bonding step.

The anode water-repellent layer and the cathode water-repellent layer were disposed such that they sandwich the CCM, after which a pressure of 5 MPa was applied thereto for one minute using a hot-pressing apparatus maintained at a temperature of 125° C. so as to bond the water repellent layers to the catalyst layers. Then, the PTFE sheet serving as the substrate was removed.

A cross section of the interface between the anode catalyst layer and the anode water repellent layer as well as a cross section of the interface between the cathode catalyst layer and the cathode water-repellent layer were observed by SEM. As a result, few interstices were observed between the anode catalyst layer and the anode water-repellent layer as well as between the cathode catalyst layer and the cathode water-repellent layer. The total length L of the regions having a distance between the water-repellent layer and the catalyst layer of 5 μm or greater in a 1 mm long portion (linear length) of the interface was determined for the anode and the cathode. As a result, the total length L was 0.07 mm (7%) for both the anode and the cathode.

(4) Gas Diffusion Layer

As the anode gas diffusion layer, TGP-H-090 (carbon paper) obtainable from Toray Industires, Inc. was used. The carbon paper had a surface roughness Rmax of about 50 μm.

As the cathode gas diffusion layer, Avcarb (trademark) 1071HCB (carbon cloth) obtainable from Ballard Material Products, Inc. was used. The carbon cloth had a surface roughness Rmax of about 120 μm.

In order to impart water repellency to the carbon paper and the carbon cloth, the carbon paper and the carbon cloth were immersed in a liquid prepared by diluting a PTFE dispersion D-1 obtainable from Daikin Industries, Ltd. to a desired PTFE concentration (7 wt %) for one minute, which were then dried in a hot air dryer heated at 100° C. and baked in an electric furnace heated at 270° C. for 2 hours. The amount of PTFE contained in each gas diffusion layer was 10 wt %.

Each gas diffusion layer was not bonded to the water-repellent layer. Instead, in the assembling of a fuel cell, the anode gas diffusion layer was disposed on the outer surface of the anode water-repellent layer, and the cathode gas diffusion layer was disposed on the outer surface of the cathode water-repellent layer, which were then fixed by clamping with a pressure.

The following lists the physical properties of the water-repellent layers.

<Anode Water-Repellent Layer>
Average thickness: 30 μm
Difference between the maximum thickness and the minimum thickness: 7 μm
Length L: 0.07 mm <Cathode Water-Repellent Layer>
Average thickness: 30 μm
Difference between the maximum thickness and the minimum thickness: 6 μm
Length L: 0.07 mm

(5) Production of Fuel Cell

As the separators, 2 mm thick graphite plates were used. A graphite plate having a fuel flow channel 9a formed on one surface thereof by cutting was used as the anode-side separator 8a. A graphite plate having an air flow channel 9b formed on one surface thereof by cutting was used as the cathode-side separator 8b. The fuel flow channel 9a and the air flow channel 9b had a serpentine shape. The fuel flow channel 9a and the air flow channel 9b had a depth of 1 mm and a width of 1 mm.

As the end plates 10, 1 cm thick stainless steel plates were used. Between each end plate 10 and each separator was disposed a 2 mm thick copper plate (not shown) connected to an electronic load apparatus to measure power generation capability. The surface of the copper plates was plated with gold.

The end plates had apertures (not shown) for inserting bolts formed therein. A stack of the MEA and the separators was sandwiched by a pair of end plates 10. The end plates 10 were clamped using bolts, nuts and springs with a clamping pressure of 5 kgf/cm$^2$. Thereby, Cell A was produced.

EXAMPLE 2

A CCM, gas diffusion layers and water-repellent layers formed on substrates were produced in the same manner as in EXAMPLE 1. Each water repellent layer and each gas diffusion layer were bonded by allowing them to pass through rollers having a predetermined space therebetween.

Similar to EXAMPLE 1, the carbon paper as the anode-side gas diffusion layer had a surface roughness of about 50 μm. The carbon cloth as the cathode-side gas diffusion layer had a surface roughness of about 120 μm.

The bonded assemblies, each comprising the water-repellent layer and the gas diffusion layer, were disposed such that they sandwich the CCM, after which a pressure of 5 MPa was applied thereto for one minute using a hot-pressing apparatus maintained at a temperature of 125° C. for heat transferring. Thereby, an MEA was obtained.

For the anode and the cathode, a cross section of the interface between the catalyst layer and the water-repellent layer was observed by SEM. As a result, few interstices were observed between the catalyst layer and the water-repellent layer. The total length L of the regions having a distance between the water-repellent layer and the catalyst layer of 5 μm or greater in a 1 mm long portion (linear length) of the interface was determined for the anode and the cathode. As a result, the total length L was 0.1 mm (10%) for both the anode and the cathode. The thickness of each water-repellent layer was measured at six different points in a predetermined region of the water-repellent layer. The anode water-repellent layer and the cathode water-repellent layer had an average thickness of 30 μm.

Cell B was produced in the same manner as in EXAMPLE 1 except that the thus-obtained MEA was used.

The following lists the physical properties of the water-repellent layers.

<Anode Water-Repellent Layer>
 Average thickness: 30 μm
 Difference between the maximum thickness and the minimum thickness: 7 μm
 Length L: 0.1 mm <Cathode Water-Repellent Layer>
 Average thickness: 30 μm
 Difference between the maximum thickness and the minimum thickness: 6 μm
 Length L: 0.1 mm

COMPARATIVE EXAMPLE 1

An anode water-repellent layer and a cathode water-repellent layer were formed by applying the water-repellent paste used in EXAMPLE 1 directly onto the same gas diffusion layer as was used in EXAMPLE 1 using a bar coater. Each water-repellent layer was then dried and baked in the same manner as in EXAMPLE 1 to obtain a bonded assembly including the gas diffusion layer and the water-repellent layer.

In the anode water-repellent layer formed on the anode gas diffusion layer, the difference between the maximum thickness and the minimum thickness was 12 μm.

In the cathode water-repellent layer formed on the cathode gas diffusion layer, the difference between the maximum thickness and the minimum thickness was 22 μm.

Figure 2:
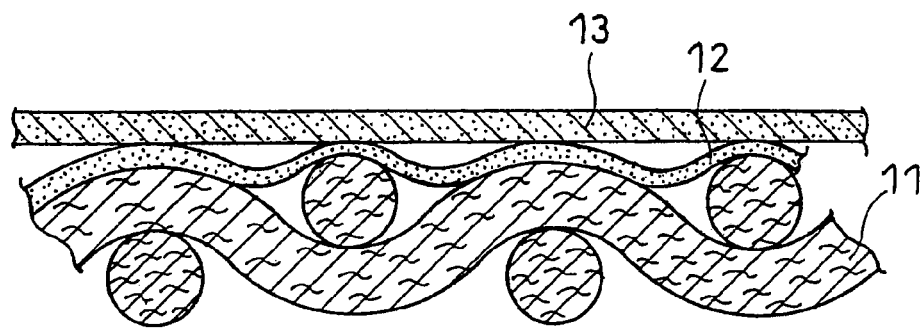
FIG. 2 is a schematic cross-sectional diagram showing the condition of a gas diffusion layer, a water-repellent layer and a catalyst layer included in a conventional fuel cell electrode.

In both the anode water-repellent layer and the cathode water-repellent layer, the gas diffusion layer had asperities similar to those of the gas diffusion layer 11 of FIG. 2.

The bonded assemblies, each comprising the gas diffusion layer and the water-repellent layer, were bonded to the CCM by hot-pressing in the same manner as in EXAMPLE 2 to produce an MEA. For the anode and the cathode, a cross section of the interface between the catalyst layer and the water-repellent layer was observed by SEM. As a result, interstices appearing intermittently were observed in the interface. In other words, in a 1 mm long portion (linear length) of the interface, the total length L of the regions having a distance between the water-repellent layer and the catalyst layer of 5 μm or greater was 0.4 mm (40%) for both the anode and the cathode.

Further, cracks were observed in the water-repellent layers. The cracking was more noticeable on the gas diffusion layer comprising a carbon cloth. The cracks were mostly observed in the recesses (i.e., where the warp and weft threads did not intersect). The cracked portions of the water-repellent layer had a thickness not less than 5 μm larger than that of the crack-less portions of the water-repellent layer. The length L was determined excluding the length of the portions in which the catalyst layer and the water-repellent layer did not face each other due to cracking.

Cell R1 was produced in the same manner as in EXAMPLE 1 except that the above MEA was used.

The following lists the physical properties of the water-repellent layers produced in COMPARATIVE EXAMPLE 1.

<Anode Water-Repellent Layer>
 Average thickness: 30 μm
 Difference between the maximum thickness and the minimum thickness: 12 μm
 Length L: 0.4 mm <Cathode Water-Repellent Layer>
 Average thickness: 30 μm
 Difference between the maximum thickness and the minimum thickness: 22 μm
 Length L: 0.4 mm

COMPARATIVE EXAMPLE 2

When a water-repellent layer was formed on a gas diffusion layer, the water repellent paste was sprayed onto the gas diffusion layer by a spraying method, followed by drying and baking to obtain a composite of the water-repellent layer and the gas diffusion layer. The gas diffusion layer was fixed onto a hot plate maintained at a temperature of 60° C. For the spraying, an airbrush and compressed air were used.

In the anode water-repellent layer formed on the anode gas diffusion layer, the difference between the maximum thickness and the minimum thickness was 8 μm.

In the cathode water-repellent layer formed on the cathode gas diffusion layer, the difference between the maximum thickness and the minimum thickness was 8 μm.

In both the anode water-repellent layer and the cathode water-repellent layer, the gas diffusion layer had asperities similar to those of the gas diffusion layer 11 of FIG. 2.

Cell R2 was produced in the same manner as in COMPARATIVE EXAMPLE 1 except that the above MEA was used.

After the composite of the water repellent layer and the gas diffusion layer was bonded to the catalyst layer, the cross section of the interface between the catalyst layer and the water-repellent layer was observed by SEM. As a result, interstices appearing intermittently were observed in the interface. In a 1 mm long portion (linear length) of the interface, the total length L of the regions having a distance between the water-repellent layer and the catalyst layer of 5 μm or greater was 0.34 mm (34%) for both the anode and the cathode. However, cracks as observed in COMPARATIVE EXAMPLE 1 were not observed in this example.

The following lists the physical properties of the water-repellent layers produced in COMPARATIVE EXAMPLE 2.

<Anode Water-Repellent Layer>

Average thickness: 30 μm

Difference between the maximum thickness and the minimum thickness: 8 μm

Length L: 0.34 mm

<Cathode Water-Repellent Layer>

Average thickness: 30 μm

Difference between the maximum thickness and the minimum thickness: 8 μm

Length L: 0.34 mm

The fuel cells produced in EXAMPLEs 1 to 2 and COMPARATIVE EXAMPLEs 1 to 2 were evaluated in terms of initial power generation characteristics.

The initial power generation characteristics were measured as follows.

The temperature of each fuel cell was controlled to be 60° C. using an electric wire heater and a temperature controller. Each cell was connected to an electronic load apparatus (PLZ164WA manufactured by Kikusui Electronics Corporation), and a voltage obtained one minute after the start of power generation was recorded. The measurement was performed under constant current control with a current density of 200 mA/cm$^2$. At the same time, using an AC resistance meter (impedance meter Model 3566 manufactured by Tsuruga Electric Corporation), the internal impedance of the cell was measured.

As the fuel, an aqueous solution of 2 mol/L methanol concentration was used. The fuel was supplied to the anode of each cell at a flow rate of 2 cm$^3$/min using a tube pump. To the cathode, non-humidified air was supplied by controlling the flow rate using a mass flow controller. Measurement was done using an air flow rate of 200 cm$^3$/min and an air flow rate of 500 cm$^3$/min. The results are shown in Table 1.

TABLE 1

| | Air flow rate: 200 cm$^3$/min | | Air flow rate: 500 cm$^3$/min | |
|---|---|---|---|---|
| | Voltage (V) | Impedance (mΩ) | Voltage (V) | Impedance (mΩ) |
| Cell A | 0.37 | 6.0 | 0.39 | 6.4 |
| Cell B | 0.37 | 6.0 | 0.38 | 6.4 |
| Cell R1 | 0.30 | 6.3 | 0.34 | 6.7 |
| Cell R2 | 0.32 | 6.4 | 0.36 | 6.8 |

As can be seen from Table 1, the impedance of the cells of the present invention (EXAMPLEs 1 and 2) was lower than that of the cells of the comparative examples. This is presumably because the contact resistance between the catalyst layer and the water-repellent layer was successfully reduced.

In terms of power generation characteristics, the cells of the present invention could generate a high voltage regardless of the air flow rate used, but the output voltage of the cells of the comparative examples was significantly low particularly at a small air flow rate. This is presumably because flooding phenomenon occurred at the interface between the catalyst layer and the water-repellent layer in the cells of the comparative examples. The flooding phenomenon inhibited the diffusion of air, and presumably it led to the degradation of power generation capability.

The foregoing indicates that the fuel cell including the fuel cell electrode of the present invention exhibits a lower impedance than conventional fuel cells and is capable of offering a high power output.

The fuel cell of the present invention is useful as a power source for portable compact electronic devices such as cell phones, personal digital assistants, notebook computers and video cameras. The fuel cell of the present invention is also applicable as a power source for electric scooters or the like.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A fuel cell electrode comprising:
   a catalyst layer;
   a gas diffusion layer; and
   a water-repellent layer interposed between said catalyst layer and said gas diffusion layer, an average thickness of the water-repellent layer being 10 to 50 μm,
   wherein said water-repellent layer has a uniform thickness, one surface of said water-repellent layer being bonded to said catalyst layer, and the other surface of said water-repellent layer facing said gas diffusion layer, and
   said catalyst layer and said water-repellent layer are in intimate contact with each other and have substantially no interstice therebetween,
   wherein a difference between a maximum thickness and a minimum thickness of the water-repellent layer is not great than 24% of an average thickness of the water-repellent layer,
   wherein, at an interface of the catalyst layer and the water-repellent layer in a cross-section, a sum of lengths of interface portions which have a distance between the catalyst layer and the water-repellent layer of 5 μm or greater is 0.1 mm or less per 1 mm of the interface, and wherein said water-repellent layer comprises a water-repellent material and an electron conductive material.

2. The fuel cell electrode in accordance with claim 1, wherein said other surface of said water-repellent layer is bonded to said gas diffusion layer.

3. A fuel cell comprising:

a membrane electrode assembly comprising an anode, a cathode and an electrolyte membrane interposed between said anode and said cathode;

an anode-side separator having a fuel flow channel for supplying a fuel to said anode; and a cathode-side separator having an air flow channel for supplying air to said cathode, wherein at least one selected from said anode and said cathode is the fuel cell electrode in accordance with claim 1.

4. The fuel cell electrode in accordance with claim 1, wherein an amount of the water-repellent material is 10 to 60 wt % relative to a total amount of the water-repellent material and the electron conductive material.

5. The fuel cell electrode in accordance with claim 1, wherein said other surface of said water-repellent layer has a surface roughness Rmax of not greater than 1 μm.

6. The fuel cell electrode in accordance with claim 1, wherein said electron conductive material comprises carbon black.

7. The fuel cell electrode in accordance with claim 1, wherein said fuel cell is direct methanol fuel cell.

* * * * *